US010504015B2

(12) United States Patent
Egan

(10) Patent No.: US 10,504,015 B2
(45) Date of Patent: *Dec. 10, 2019

(54) ITEM SECURITY SYSTEM AND METHOD OF VERIFYING ITEMS SELECTED FOR PURCHASE AT A CHECKOUT STATION

(71) Applicant: NCR Corporation, Atlanta, GA (US)

(72) Inventor: Gregory Scott Egan, Flowery Brance, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,111

(22) Filed: Jul. 16, 2018

(65) Prior Publication Data
US 2018/0341842 A1 Nov. 29, 2018

Related U.S. Application Data

(63) Continuation of application No. 15/606,232, filed on May 26, 2016, now Pat. No. 10,043,119.

(51) Int. Cl.
G08B 19/00 (2006.01)
G06K 17/00 (2006.01)
G07G 1/00 (2006.01)
G08B 13/24 (2006.01)
G08B 21/24 (2006.01)
G07G 3/00 (2006.01)
G06Q 10/08 (2012.01)
H04W 4/80 (2018.01)
G06K 7/10 (2006.01)

(52) U.S. Cl.
CPC ......... *G06K 17/0029* (2013.01); *G07G 1/009* (2013.01); *G07G 1/0045* (2013.01); *G07G 1/0054* (2013.01); *G07G 3/003* (2013.01); *G08B 13/24* (2013.01); *G08B 13/246* (2013.01); *G08B 21/24* (2013.01); *G06K 7/10108* (2013.01); *G06Q 10/087* (2013.01); *G08B 13/2417* (2013.01); *G08B 13/2482* (2013.01); *H04W 4/80* (2018.02)

(58) Field of Classification Search
CPC .......................... G06K 17/0029; G07G 17/05
USPC ............... 340/5.8, 10.1, 10.2, 426.13, 568.1; 235/382, 383, 385, 492
See application file for complete search history.

(56) References Cited

U.S. PATENT DOCUMENTS

| 7,620,568 | B1 | 11/2009 | Parker-Malchak | |
|---|---|---|---|---|
| 2004/0111320 | A1* | 6/2004 | Schlieffers | A47F 9/047 705/16 |
| 2007/0102513 | A1 | 5/2007 | Scheb | |
| 2010/0140351 | A1 | 6/2010 | Trenciansky | |
| 2014/0125800 | A1* | 5/2014 | Van Nest | G07G 3/003 348/143 |
| 2014/0338987 | A1 | 11/2014 | Kobres | |

* cited by examiner

*Primary Examiner* — Tai T Nguyen
(74) *Attorney, Agent, or Firm* — Schwegman, Lundberg & Woessner

(57) ABSTRACT

An item security system and method of verifying items selected for purchase at a checkout station which focus on reducing losses at the checkout station as opposed to exits. One example method includes reading wireless tags on items at a checkout station by a wireless tag reader, reading barcodes on a number of the items at the checkout station by a barcode reader, comparing the number of items with read barcodes to the items with read wireless tags, and issuing an alert when the number of items is less than all of the items.

9 Claims, 3 Drawing Sheets

ITEM SECURITY SYSTEM AND METHOD OF VERIFYING ITEMS SELECTED FOR PURCHASE AT A CHECKOUT STATION

CROSS-REFERENCE TO RELATED APPLICATION

This application is a Continuation Application of, and claims priority to, U.S. Pat. No. 10,043,119, issued Aug. 7, 2018.

BACKGROUND

The present invention relates generally to security at point-of-sale locations and, more specifically, to an item security system and method of verifying items selected for purchase at a checkout station.

Some stores may attach security labels to items offered for purchase. Current loss prevention systems and methods are directed to identifying unpurchased items at an exit location using sensors that detect security labels that have not been deactivated at a checkout station. These systems include an alarm which sounds when a security label that has not been deactivated passes in proximity to the sensors. The alarm is intended to alert security personnel so that they may stop customers carrying items with security labels that have not been deactivated.

However, checkout personnel often fail to correctly deactivate security labels on purchased items, which results in the alarm being sounded when a legitimate customer passes the sensors at the exit location. Checkout and other store personnel often expect this situation and ignore the alarm when it sounds. Store personnel also find stopping people at the door to be awkward, regardless of whether the person carrying the items is a legitimate customer or a shoplifter.

Therefore, it would be desirable to provide an alternative security system method by providing an item security system and method at a checkout station.

SUMMARY

In accordance with the teachings of the present invention, a system and method of detecting movement of an item is provided.

One example method of verifying items selected for purchase at a checkout station includes reading wireless tags on items at a checkout station by a wireless tag reader, reading barcodes on a number of the items at the checkout station by a barcode reader, comparing the number of items with read barcodes to the items with read wireless tags, and issuing an alert when the number of items is less than all of the items.

One example method of verifying items tagged with radio frequency identification (RFID) tags and selected for purchase at a checkout station includes reading the RFID tags on the items at the checkout station by a wireless tag reader, adding RFID tag data from the wireless tags and corresponding item identification data from an item database in a list file, reading barcodes on a number of the items at the checkout station by a barcode reader, adding item identification data from read barcodes to a transaction record of scanned items, comparing item identification data in the list file to item identification in the transaction record of scanned items, and issuing an alert when the transaction record of scanned items fails to contain one or more instances of the item identification data in the list file.

One example item security system at a checkout station includes a wireless tag reader at the checkout station, a barcode reader at the checkout station, and a transaction terminal at the checkout station configured to obtain wireless tag data from wireless tags on items selected for purchase at the checkout station from the wireless tag reader, obtain barcode item identification data from less than all of the items during scanning of the items at the checkout station from the barcode reader, identify one or more of the items that were not scanned, and issue an alert to an operator to scan the one or more items.

It is accordingly an object of the present invention to provide an item security system and method of verifying items selected for purchase at a checkout station.

It is accordingly an object of the present invention to provide an item security system and method of verifying items selected for purchase at a checkout station which compares scanned items to detected items with wireless identification tags, such as RFID tags.

It is another object of the present invention to provide a system and method of detecting attempted thefts at a checkout station, as opposed to at an exit.

It is another object of the present invention to provide a system and method of deterring and avoiding thefts by detecting and identifying unscanned items and alerting the operator to scan the items.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
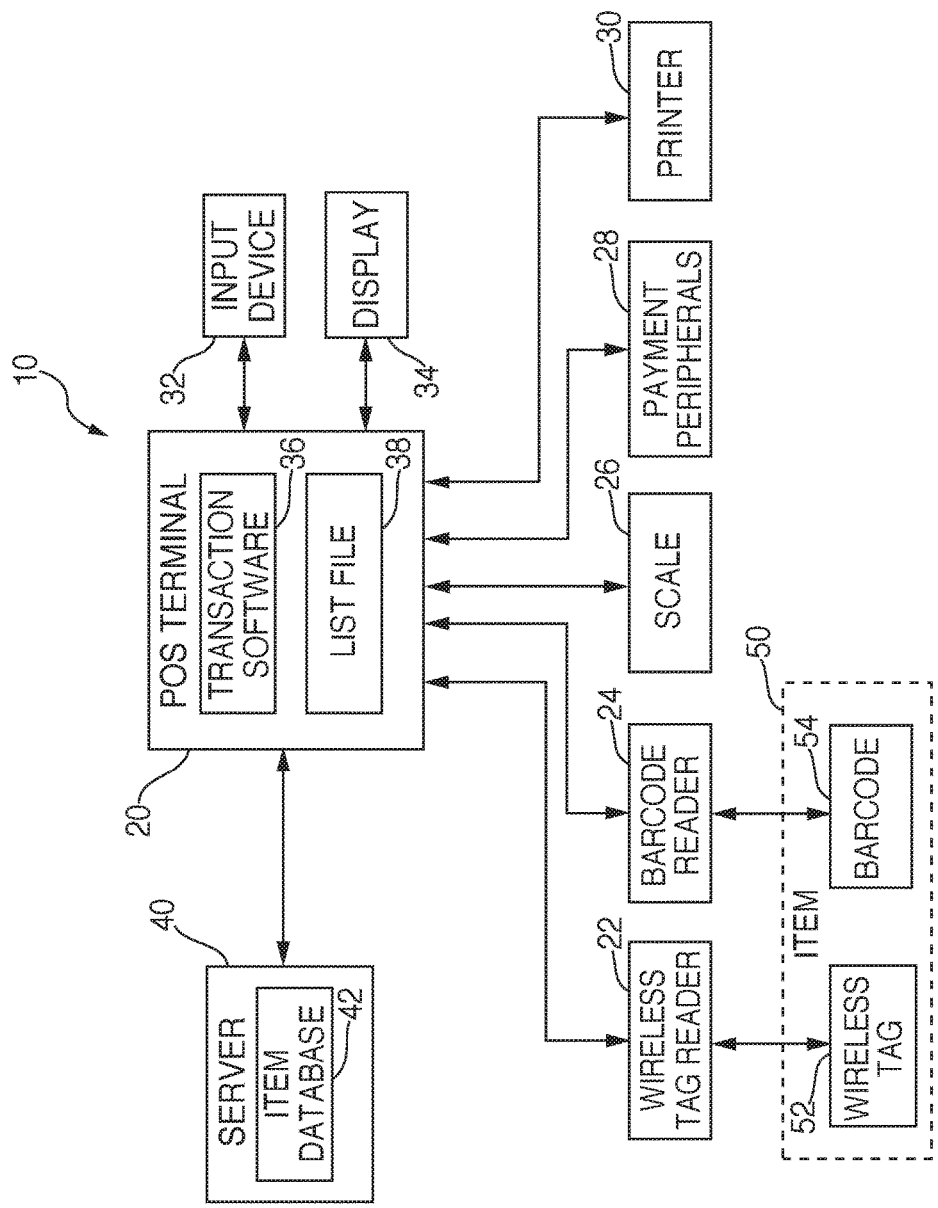
FIG. 1 is a block diagram illustrating an example point of sale (POS) system.

Referring now to FIG. 1, an example transaction system 10 primarily includes point of sale (POS) terminal 12 and various peripherals for completing POS transactions. POS terminal 12 and its peripherals may be located at a checkout station. All types of checkout stations are envisioned, including those configured for self-service transactions and those configured for assisted-service transactions. Further, all types and combinations of transaction establishments are also envisioned, including grocery stores, general merchandise stores, apparel stores, and combinations thereof.

Although embodiments of the present invention may be deployed in various configurations and used in a multi-platform or omni-channel environment. Software disclosed herein may be deployed in different platforms and configurations, for example, client server, SaaS, cloud, multi-tenancy, thin client, thick client, service-oriented architecture, micro-services, containerized, virtualized, and omni-channel systems.

In an example embodiment, POS terminal 12 includes one or more processors, memory, and program and data storage. POS terminal 12 may execute an operating system, such as a Microsoft, Google, Apple, or Linux operating system. POS terminal 12 further includes network circuitry for connecting to a network, via wire and/or wireless, and other circuitry for connecting to the various peripherals. For example, POS terminal 12 may include Universal Serial Bus (USB) circuitry and/or Bluetooth standard circuitry.

In the example embodiment, peripherals used by POS terminal 12 to complete transactions may include barcode reader 24, scale 26, one or more payment peripherals 28, printer 30, input device 32, and display 34.

In the example embodiment, POS terminal 12 executes transaction software 36, which displays transaction screens on display 34 and receives operator selections via input device 32 in order to complete a transaction with a customer. Specifically, transaction software uses item identification data to obtain prices from item database 42 and completes payment for selected items.

In the example embodiment, barcode reader 24 is the primary peripheral for identifying items selected for purchase. An operator may alternatively use input device 32, for example, when manually keying in identification information for produce and items with defective barcodes.

Barcode reader 24 reads barcodes on items to obtain item identification data, and sends the item identification data to transaction software 36, which then adds the items to the current transaction as part of a transaction record.

An example barcode reader 24 may include one or more cameras for capturing images of products, and software for locating and decoding barcodes in images.

Another example barcode reader 24 may include one or more lasers, mirrors for scanning a barcode on an item using laser light, and software for decoding the barcodes in signals from photodetectors.

Another example barcode reader 24 may include a combination of camera and laser-based scanning components.

In the example embodiment, scale 26 is used to items which are sold by weight, such as produce items.

An example scale 26 is integrated into barcode reader 24 and includes one or more load cells and a weigh plate. The weigh plate includes a window to allow barcode reading elements to scan barcodes on items above the weight plate.

In the example embodiment, payment peripherals 28 may include one or more of a payment card reader, personal identification number (PIN) keypad for debit card purchases, signature capture pad, cash money drawer, a coin acceptor, a coin dispenser, currency acceptor, currency dispenser, a coin recycler, and a currency recycler.

An example payment peripheral 28 includes a payment terminal that combines the card reader, PIN keypad, and signature capture pad in a single housing.

Various configurations of payment peripherals are envisioned. Further, configurations may be based upon the use for POS terminal 12. For example, an assisted-service checkout station may include a cash money drawer, whereas a self-service checkout station may include currency and coin recyclers.

An example printer 30 includes a printer for printing receipts, coupons, and other information.

An example Input device 32 may include a keyboard or touch overlay to display 34.

In the example embodiment, POS terminal 12 implements a security check explained in more detail below which determines items that have not been scanned by barcode reader 24. The security function may involve tracking items that have been scanned by barcode reader 24 and items that have not been scanned by barcode reader 24.

In one example embodiment, transaction software 36 may be configured for this purpose. In another example embodiment, POS terminal 12 may execute separate security software for this purpose.

In one example embodiment, transaction system 10 includes one or more wireless tag readers 22 for reading wireless labels or tags 52, which may include radio frequency identification (RFID) tag readers and RFID tags on items 50.

When a wireless tag 52 is present on item 50, along with barcode 54, wireless tag reader 22 reads data from wireless tag 52. The wireless tag data may include item identification data or may include information cross-referenced to the barcode item identification data in item database 42. For example, each wireless tag 52 may contain a unique tag number that may be cross-referenced to barcode data in item database 42. For like items, item database 42 may contain a plurality of different wireless tag data associated with each barcode data.

In one example embodiment, wireless tag reader 22 may be used in connection with barcode reader 24 for redundancy, or in lieu of barcode reader 24, to identify items 50 and enter them into a transaction. Barcode reader 24 may typically be used as the primary peripheral for scanning items into a transaction, but roles may be reversed, with wireless tag reader 24 being the primary peripheral for scanning items into a transaction and barcode reader 24 being used instead to scan items for the security check.

In one example embodiment, transaction software 36 may be configured to issue an alert when RFID data is received from wireless tag 52 on an item 50, but corresponding barcode data has not been received from barcode reader 24.

In one example embodiment, transaction software 36 may be configured to issue an alert when RFID data is received from wireless tags 52 on all items 50 with wireless tags, but corresponding barcode data has been received from a number of items less than all of the items.

In the example embodiment, all items or fewer than all items may be tagged with wireless tags 52. For example, an establishment may choose to only apply wireless tags 52 to high-value items, items which would result in the establishment suffering significant losses if they were stolen.

In the example embodiment, any type of wireless tag 52 may be employed, such as active or passive RFID tag in any of the Low Frequency (LF), High Frequency (HF), or Ultra High Frequency (UHF) bands. Passive UHF RFID tags offer a low-cost alternative for retail inventory tracking and have a range that is suited for a checkout environment.

In the example embodiment, one or more wireless tag readers 52 and their connected antennas may be located on or in the vicinity of a checkout station.

In the example embodiment, a single wireless tag reader 22 may be connected to multiple antennas that are positioned at various locations on the checkout station. For example, wireless tag reader 22 may be connected a multiplexor which supports multiple antennas.

In the example embodiment, wireless tag 52 reading range may be optimized and limited to within a reading boundary associated with a particular checkout station to ensure that wireless tags 52 within the reading boundary are read and that wireless tags 52 of other nearby items selected by other customers at the same or other checkout stations are not read. For example, the reading boundary may be established by adjustment of wireless tag reader 22 transmit power, selection of suitable antennas based upon their gain and size, and optimization of antenna directivity and placement.

In one example embodiment, the reading boundary may extend vertically from the floor to the highest point of the checkout station.

In one example embodiment, the reading boundary may extend from the barcode reader to a bagging well, including coverage for the operator area. For this purpose, various antennas may be positioned at various locations on the checkout station.

In one example embodiment, POS terminal 12 identifies items 50 with wireless tags 52 that have not been scanned by barcode reader 24.

In one example embodiment, transaction software 36 may be configured to determine whether wireless tag data corresponds to barcode data obtained from barcode reader 24. This serves to determine whether a theft or item substitution attempt has occurred.

When no corresponding barcode data from barcode reader 24 was made of record in a transaction (indicating that item 50 was not scanned by the operator), transaction software 36 issues an alert. For example, transaction software 36 may be configured to display an alert to the operator, instructing the operator to scan item 50. In an assisted-service transaction, transaction software 36 may be configured to send an alert to a supervisor or head cashier. In a self-service transaction, transaction software 36 may be configured to send an alert to an attendant. Under some circumstances, transaction software 36 may be configured to issue an alert to security personnel.

As another example, transaction software 36 may be configured to give the operator a specific time period to scan item 50. If the corresponding barcode data is not received following expiration of the time period, transaction software 36 may be configured to send an alert.

In one example embodiment, transaction software 36 may be configured to issue the alert after an operator selection that finalizes the total amount of a transaction, such as pressing a "total" or equivalent button or key.

In one example embodiment, transaction software 36 may be configured to issue the alert after an operator selection related to a payment phase of a transaction, such as pressing a "finish and pay" or equivalent button or key, or a choice of credit card button or key.

In one example embodiment, transaction software 36 may be configured to create a list file 38 containing wireless tag data from wireless tags 52 that have been read.

In one example embodiment, transaction software 36 may be configured to also add corresponding barcode data from item database 42 to list file 38 for later comparison to scanned barcode data. Alternatively, transaction software 36 may read corresponding barcode data from item database 42 to compare with scanned barcode data when the security check is completed.

In one example embodiment, transaction software 36 may be configured to also add barcode data associated with scanned items to list file 38. Alternatively, transaction software 36 may read scanned barcode data from the transaction record when a security check is completed.

Wireless tags 52 may be expected to be read before corresponding items are scanned. However, transaction software 36 may be configured to check list file 38 and the transaction record for scanned barcode data to account for items that are scanned before their wireless tag data is received.

Wireless tags 52 may be read multiple times while items are at a checkout station. In one example embodiment, transaction software 36 may be configured to compare wireless tag data already in list file 38 to newly read wireless tag data and only add new wireless tag data that is not already in list file 38.

In one example embodiment, transaction software 36 may be configured to identify a plurality of like items 50 with wireless tags 52 and enter wireless tag data and corresponding identification data in list file 38.

In one example embodiment, transaction software 36 may be configured to add any unscanned pluralities of like items to list file 38 and remove them incrementally each time one of the like items is scanned. For example, when six like items having different wireless tag data are read by wireless tag reader 22, six different entries having the same item identification data are included within list file 38. When transaction software 36 receives the barcode data only five times as part of five scanning events, transaction software 36 removes only five of the item entries from list file 38. The five item entries may be arbitrary, since transaction software 36 is tracking scanning events.

In one example embodiment, transaction software 36 may be configured to add entries to list file 38 from the time it receives an indication to begin a transaction.

In one example embodiment, transaction software 36 may be configured to add entries to list file 38 when a first barcode 54 is read on a first item 50.

In one example embodiment, transaction software 36 may be configured to compare scanned items to items in list file 38 and remove scanned items from list file 38 after the last item 50 is scanned by barcode reader 24.

In one example embodiment, transaction software 36 may be configured to stop adding entries to list file 38 after an operator selection that finalizes the total amount of a transaction, such as pressing a "total" or equivalent button or key step.

In one example embodiment, transaction software 36 may be configured to stop adding entries to list file 38 after an operator selection of a step in a payment phase of a transaction, such as pressing a "finish and pay" or equivalent button or key or a choice of credit card button or key.

In one example embodiment, wireless tag reader 22 may still be interrogating wireless tags 52 and transaction software 36 may still be looking for unscanned items, while items are being bagged at an assisted-service checkout station.

In one example embodiment, transaction software 36 may be configured to compare scanned items to items in list file 38 and remove scanned items from list file 38 continuously as items 50 are scanned by barcode reader 24.

In one example embodiment, transaction software 36 may be configured to compare scanned items to items in list file 38 and remove scanned items from list file 38 after the "total" or equivalent button or key is selected by an operator.

In one example embodiment, transaction software 36 may be configured to compare scanned items to items in list file 38 and remove scanned items from list file 38 after an operator selection of a step in a payment phase of a transaction, such as pressing a "finish and pay" or equivalent button or key or a choice of credit card button or key.

Figure 2:
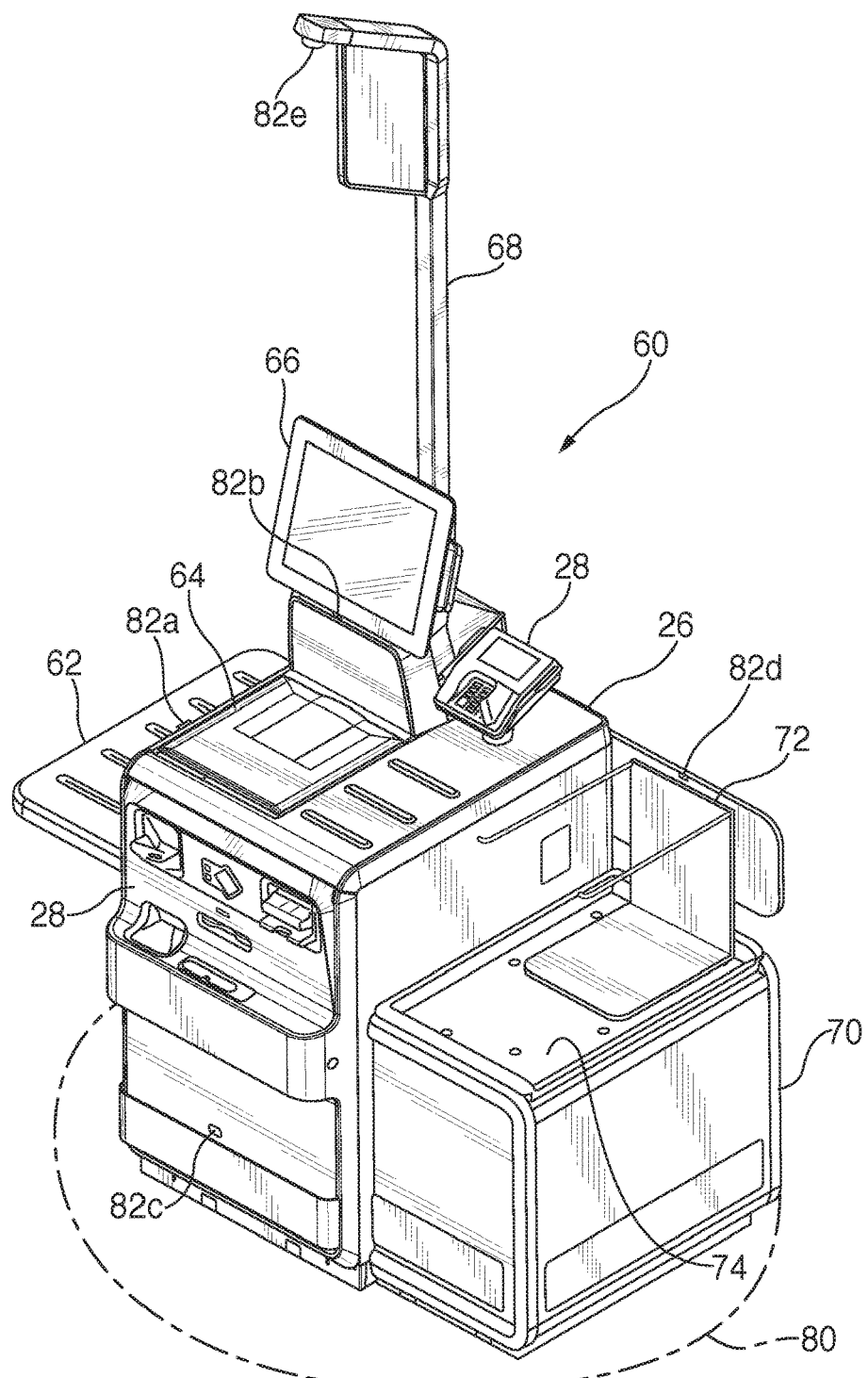
FIG. 2 is a perspective view illustrating an example checkout station.

Turning now to FIG. 2, an example checkout station 60 is illustrated, which includes a self-service checkout station operated by customers. Checkout station 60 may be one of a plurality of self-service checkout stations in a checkout area. In one example, two rows of two checkout stations 60 are located parallel to each other, with an attendant station overseeing operation at each of the checkout stations 60.

The example checkout station 60 includes an item shelf 62 on one side. Customers may place items or a small shopping basket on item shelf 62. A main portion 64 contains a barcode reader with a scale 26 in a horizontal portion flush with the checkout surface, a self-contained terminal with touch screen 66 mounted above a vertical or "tower" portion of barcode reader 64, a variety of payment peripherals 28, and a lane light assembly 68. On an opposite side, checkout station 60 includes a bag well portion 70 with a bag rack 72 and security scale 74.

The example checkout station 60 further includes an RFID tag reader and one or more antennas placed on checkout station 60 so as to create a three-dimensional reading boundary 80 around checkout station 60 (where only a footprint of the reading boundary 80 on the floor is illustrated for clarity). The RFID tag reading range may be optimized and limited to within reading boundary 80 to ensure that RFID tags within reading boundary 80 are read and to ensure that RFID tags of other nearby items selected by other customers nearby or at other checkout stations 60 are not read.

In one example embodiment, RFID tag reader may be integrated into barcode reader 24.

In one example embodiment, a single RFID tag reader may be connected to multiple antennas that are positioned at various locations on the checkout station. For example, an RFID tag reader may be connected to a multiplexor which supports multiple antennas.

In the illustrated example, five antennas 82 are placed around checkout station 60 to read RFID tags on items as they are moved from one of checkout station to the other. A first antenna 82*a* is located on a side of the main portion 64 facing the item shelf 62. A second antenna 82*b* is located within the tower portion of barcode reader 64 facing the customer. A third antenna 82*c* is located low on the main portion facing the customer and items that may be located on a lower shelf of a shopping cart. A fourth antenna 82*d* is located in bag well portion 70 facing the customer and/or the customers bags. A fifth antenna 82*e* is located on lane light assembly 68 facing downwards. Antenna coverage associated with any one antenna 82 may overlap one or more detection areas of other antennas 82.

The reading boundary 80 may be established by one or more of RFID tag reader transmit power adjustment, antenna gain selection, and optimization of antenna directivity. In this example, reading boundary 80 extends from about the left edge of item shelf 62 to about the right edge of bag well portion 70, and vertically to antenna 82*e*. A sufficient amount of space in the customer aisle where the customer moves may be covered, but the reading boundary 80 may end substantially at the opposite edge of the checkout station 80 so as to avoid the adjacent customer aisle.

Other numbers and shapes of reading boundaries 80 are also envisioned. For example, a plurality of reading boundaries 80 may be established. The reading boundaries 80 may be associated with specific areas of checkout station 60, such as shelf 62, main portion 64, and bag well portion 70.

In an alternative embodiment, reading boundary 80 may be more focused on one portion of checkout station 60 than another. For example, reading boundary 80 may be more focused on shelf 62 and the adjacent aisle and configured to optimally read most, if not all, wireless tags when the customer initiates a new transaction. In one example, coverage in this area may be enhanced by adding additional antennas and/or making other configuration changes.

In another alternative embodiment, reading boundary 80 may be more focused on the main portion 64 and the adjacent aisle with corresponding reader hardware and configuration changes.

In another alternative embodiment, reading boundary 80 may be more focused on the bag well portion 70 and the adjacent aisle with corresponding reader hardware and configuration changes.

In operation, a customer places items on shelf 62 and selects an option to begin a transaction. RFID tag reader optimally reads all RFID tags on the items using antenna 82*a*. RFID tag reader may also read RFID tags on items that have not been placed on shelf 62, depending on the reading range of antenna 82*a*. Transaction software 36 creates or updates list file 38 to include RFID tag data and corresponding barcode data. Transaction software 36 compares the contents of list file 38 to newly identified items and adds corresponding item identification data associated with the new items from item database 42.

The customer then scans the items using barcode reader 64. Optimally, RFID tag reader reads RFID tags on all scanned items using antenna 82*b*. RFID tag reader also reads RFID tags on all items below the checkout surface, such as items transferred below the checkout surface by the customer in a false scanning motion, and items remaining on the lower shelf of a shopping cart, using antenna 82*c*. Since any of the RFID tags may be read multiple times, transaction software 36 compares the contents of list file 38 to newly identified items and adds corresponding item identification data associated with the new items from item database 42.

The customer then puts the items in bags. Optimally, RFID tag reader reads RFID tags on bagged items using antenna 82*d*. Transaction software 36 compares the contents of list file 38 to newly identified items and adds corresponding item identification data associated with the items from item database 42.

At any of customer steps above, RFID tag reader may read RFID tags on items using antenna 82*e*. Since input from this or other antennas 82 may occur at various times during the transaction, transaction software 36 continuously evaluates newly identified items against the contents of list file 38 and the transaction record.

Transaction software 36 processes like items in a similar fashion. The RFID tag reader optimally reads all RFID tags on the like items using any or all of the antennas 82. Transaction software 36 creates or updates list file 38 to include RFID tag data of all the like items and corresponding barcode data. Since any of the RFID tags may be read multiple times, transaction software 36 also compares the contents of list file 38 to newly identified items and adds corresponding item identification data associated with the new items from item database 42.

In this example, transaction software 36 stops processing RFID tag information when the customer selects an option to finalize the transaction, such an option to pay, since, presumably, the self-service customer has finished scanning items at that point. Transaction software 36 makes a final comparison of the item identification data in list file 38 to the identification data in the transaction record to determine whether any items with RFID tags were not scanned.

For single items, the comparison is a one-time comparison of barcode identification data in list file 38 with barcode identification data in the transaction record.

For a plurality of like items, the comparison occurs incrementally for each instance of the common barcode identification data in the transaction record. When one or more instances remain in list file 38 after the comparison, a possible theft situation exists involving the one or more remaining like items in list file 38.

When transaction software 36 identifies one or more items in list file 38 with no corresponding data from barcode reader 64, indicating that the items were not scanned, transaction software 36 issues an alert to the operator to scan the items. After the customer scans the items, transaction software 36 deletes or clears the corresponding item identification data from list file 38 and proceeds with the payment phase.

Modifications of this method are also envisioned. For example, transaction software 36 may be configured to send a separate alert to the attendant when one or more items are added to list file 38. The attendant may then focus on the customer and provide assistance as necessary. The attendant may additionally notify security if the attendant observes any overt attempts by the customer to avoid scanning items.

Figure 3:
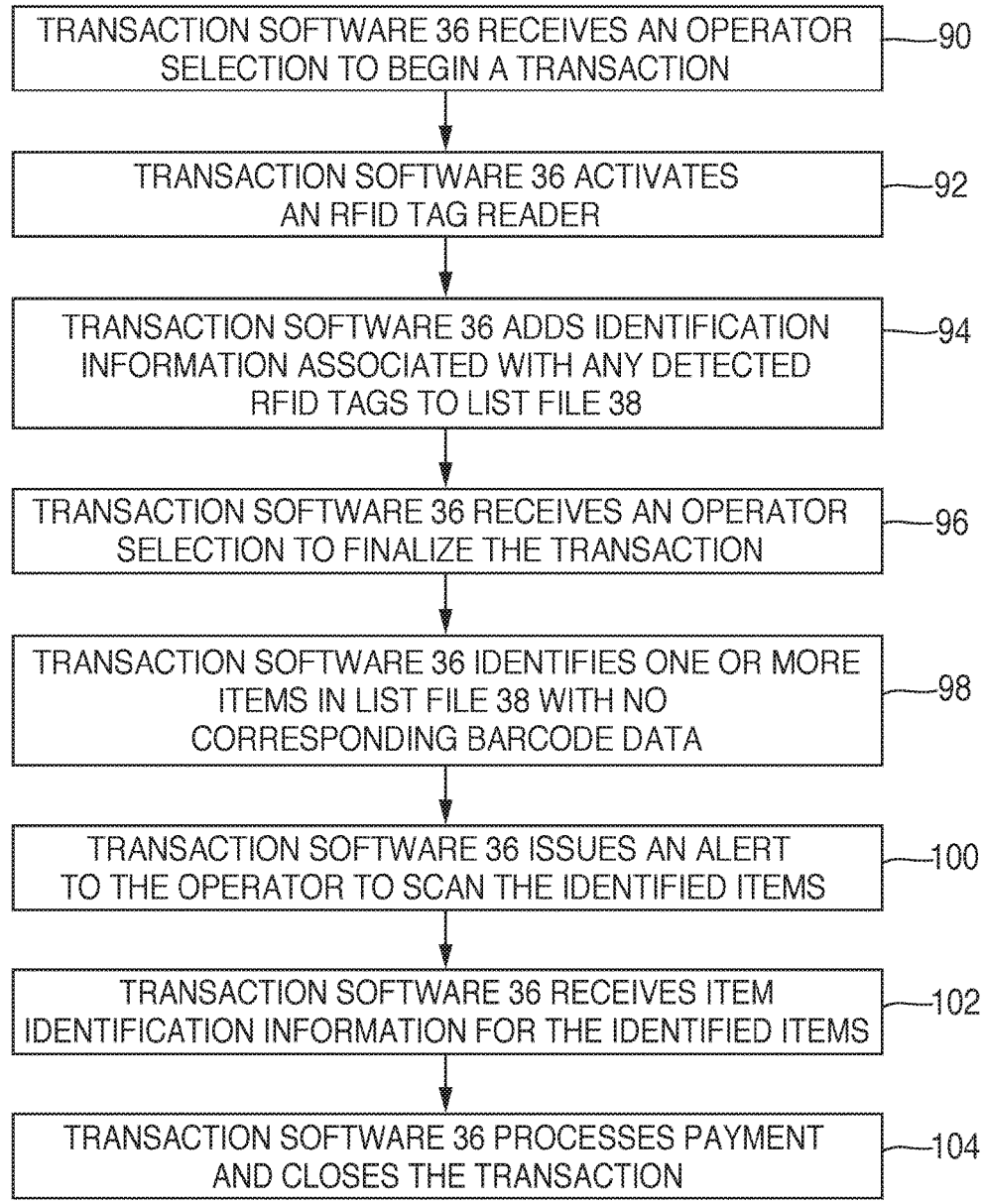
FIG. 3 is a flow diagram illustrating an example method of verifying items selected for purchase at a checkout station.

Turning now to FIG. 3, an example method of verifying items at a checkout station is illustrated, beginning with step 100.

In step 100, transaction software 36 receives an operator selection to begin a transaction at a checkout station 60.

In step 102, transaction software 36 activates the RFID tag reader to begin reading RFID tags within reading boundary 80 of checkout station 60.

In step 104, transaction software 36 adds identification information associated with any detected RFID tags to list file 38. For example, transaction software 36 may be configured to add RFID data and corresponding item identification data from item database 42.

Transaction software 36 may be configured to compare the RFID data to previously entered RFID data and only add different RFID data and corresponding identification data. Transaction software 36 may also be configured to check the transaction record when RFID data is received to determine whether the item was scanned before the RFID tag was read, and if so enter the item identification data associated with the RFID tag data.

Alternatively, transaction software 36 may be configured to wait until after scanning has finished to populate list file 38 with item identification data from item database 42 associated with the RFID data, and then compare the contents of list file 38 with scanned item identification data from the transaction record.

In step 106, transaction software 36 receives an operator selection to finalize the transaction. For example, transaction software 36 may receive a selection to total the purchases. As another example, transaction software 36 may receive a selection to process payment.

In step 108, transaction software 36 identifies one or more items in list file 38 with no corresponding data from barcode reader 64, indicating that the items were not scanned.

In step 110, transaction software 36 issues an alert to the operator to scan the identified items. Transaction software 36 may also be configured to issue an alert to any of an attendant, a supervisor, or a security person.

In step 112, transaction software 36 receives item identification data for the identified items.

In step 114, transaction software 36 processes payment and closes the transaction.

The example methods may be used in connection with both self-service and assisted service checkout stations. The reading boundary may be adjusted to cover risk areas associated with each type of checkout station.

Advantageously, the systems and methods disclosed herein would greatly reduce or deter item shrinkage due to theft, including shoplifting and sweethearting. The systems and methods would also reduce the number of customer encounters with security personnel at exit locations.

The systems and methods disclosed herein are also useful in combatting item replacement fraud, where one item is scanned and another, more expensive item, is taken. Such attempts at not scanning the more expensive item would be detected following reading of the wireless tag on the more expensive item.

The systems and methods disclosed herein may be used in conjunction with conventional exit-based security systems, including security sensors at exits and product security labels that are read by such sensors when they are not deactivated at checkout stations.

Although the present invention has been described with particular reference to certain preferred embodiments thereof, variations and modifications of the present invention can be effected within the spirit and scope of the following claims. The present invention also has applicability in tracking other types of items besides retail products and office equipment.

The invention claimed is:

1. A method of verifying items selected for purchase at a checkout station comprising:
   receiving wireless tag data from wireless tags on the items at the checkout station using a wireless tag reader;
   adding the wireless tag data from the wireless tags to a list;
   receiving barcode data from barcodes on a number of the items at the checkout station using a barcode reader;
   adding the barcode data from the barcodes to a transaction record;
   comparing the wireless tag data from the list to the barcode data in the transaction record; and
   issuing an alert when the transaction record fails to include barcode data of one of the items when the wireless tag data of the one item is in the list.

2. The method of claim 1, wherein issuing an alert comprises displaying an indication to scan the one item, and issuing the alert after a predetermined time period when the barcode data of the one item is not received.

3. The method of claim 1, wherein issuing an alert comprises issuing the alert after a selection finalizing a total amount of the number of items is received.

4. The method of claim 1, wherein issuing an alert comprises issuing the alert after a selection to provide payment is received.

5. The method of claim 1, wherein adding wireless tag data comprises comparing read wireless tag data to wireless tag data in the list and only adding the read wireless tag data to the list when the read wireless tag data is not already in the list.

6. The method of claim 1, wherein comparing comprises removing one of the items from the list after the one item is scanned.

7. The method of claim 1, wherein adding wireless tag data comprises adding wireless tag data for each of a plurality of like items to the list.

8. The method of claim 1, wherein comparing comprises removing one of the like items from the list for each one of the like items that is scanned.

9. An item security system at a checkout station comprising:
   a display at the checkout station;
   a wireless tag reader at the checkout station, including a plurality of antennas placed on the checkout station, wherein the plurality of antennas creates a reading boundary around the checkout station;
   a barcode reader at the checkout station; and
   a transaction terminal at the checkout station configured to:

receive wireless tag data from wireless tags on the items at the checkout station from a wireless tag reader;
add the wireless tag data from the wireless tags to a list;
receive barcode data from barcodes on a number of the items at the checkout station from a barcode reader;
add the barcode data from the barcodes to a transaction record;
compare the wireless tag data from the list to the barcode data in the transaction record; and
issue an alert when the transaction record fails to include barcode data of one of the items when the wireless tag data of the one item is in the list.

\* \* \* \* \*